US012246278B2

(12) United States Patent
Yao et al.

(10) Patent No.: US 12,246,278 B2
(45) Date of Patent: Mar. 11, 2025

(54) LIQUID COLLECTION ON WAVY SURFACES

(71) Applicant: Northwestern University, Evanston, IL (US)

(72) Inventors: Yuehan Yao, Evanston, IL (US); Youhua Jiang, Chicago, IL (US); Kyoo-Chul Park, Wilmette, IL (US); Christian John Machado, Evanston, IL (US)

(73) Assignee: Northwestern University, Evanston, IL (US)

( * ) Notice: Subject to any disclaimer, the term of this patent is extended or adjusted under 35 U.S.C. 154(b) by 524 days.

(21) Appl. No.: 17/263,330

(22) PCT Filed: Aug. 8, 2019

(86) PCT No.: PCT/US2019/045682
§ 371 (c)(1),
(2) Date: Jan. 26, 2021

(87) PCT Pub. No.: WO2020/033667
PCT Pub. Date: Feb. 13, 2020

(65) Prior Publication Data
US 2021/0154608 A1    May 27, 2021

Related U.S. Application Data

(60) Provisional application No. 62/716,000, filed on Aug. 8, 2018.

(51) Int. Cl.
*B01D 45/08* (2006.01)
*B01D 53/00* (2006.01)
(Continued)

(52) U.S. Cl.
CPC .......... *B01D 45/08* (2013.01); *B01D 53/002* (2013.01); *B01D 53/265* (2013.01); *E03B 3/28* (2013.01)

(58) Field of Classification Search
CPC .... B01D 45/08; B01D 53/002; B01D 53/265; B01D 45/04; B01D 5/0027; B01D 5/009; E03B 3/28; Y02A 20/00
See application file for complete search history.

(56) References Cited

U.S. PATENT DOCUMENTS

| | | | |
|---|---|---|---|
| 2,921,647 A | 1/1960 | Pietrasz | |
| 3,318,107 A * | 5/1967 | Riley | E03B 3/28 62/93 |

(Continued)

OTHER PUBLICATIONS

Anand, S., Paxson, A. T., Dhiman, R., Smith, J. D. & Varanasi, K. K., "Enhanced condensation on lubricant impregnated nanotextured surfaces," *ACS Nano*, vol. 6, No. 11, pp. 10122-10129, (2012).

(Continued)

*Primary Examiner* — Christopher P Jones
*Assistant Examiner* — Phillip Y Shao
(74) *Attorney, Agent, or Firm* — Bell & Manning, LLC

(57) ABSTRACT

A system to collect liquid includes a wavy surface formed on a substrate, where the wavy surface includes a plurality of waves. The plurality of waves are configured to capture liquid from the air such that the liquid accumulates in valleys of the waves. The system also includes a liquid collection container configured to collect the liquid captured on the plurality of waves.

9 Claims, 10 Drawing Sheets

(51) Int. Cl.
  B01D 53/26 (2006.01)
  E03B 3/28 (2006.01)

(56) References Cited

U.S. PATENT DOCUMENTS

| | | | | |
|---|---|---|---|---|
| 4,304,577 | A * | 12/1981 | Ito | B01D 53/261 |
| | | | | 96/127 |
| 4,345,917 | A * | 8/1982 | Hussmann | E03B 3/28 |
| | | | | 95/125 |
| 4,581,051 | A | 4/1986 | Regehr et al. | |
| 7,311,115 | B1 * | 12/2007 | Wendell | E03B 1/04 |
| | | | | 137/236.1 |
| 7,337,615 | B2 * | 3/2008 | Reidy | E03B 3/28 |
| | | | | 62/3.4 |
| 7,722,706 | B2 * | 5/2010 | Thielow | B01D 53/28 |
| | | | | 96/272 |
| 7,886,547 | B2 * | 2/2011 | Sullivan | E03B 3/28 |
| | | | | 62/93 |
| 8,307,669 | B2 | 11/2012 | Taras et al. | |
| 8,347,927 | B2 * | 1/2013 | Mitchell | A01G 13/0281 |
| | | | | 47/32.4 |
| 8,747,530 | B2 * | 6/2014 | Goelet | B01D 5/00 |
| | | | | 95/117 |
| 8,985,326 | B2 | 3/2015 | Halsne et al. | |
| 2001/0029793 | A1 | 10/2001 | Moler et al. | |
| 2004/0000165 | A1 * | 1/2004 | Max | E03B 3/28 |
| | | | | 62/615 |
| 2004/0109981 | A1 * | 6/2004 | Lawrence | B01D 1/305 |
| | | | | 428/141 |
| 2005/0044862 | A1 * | 3/2005 | Vetrovec | B01D 53/265 |
| | | | | 62/93 |
| 2005/0244304 | A1 | 11/2005 | Tonkovich et al. | |
| 2007/0028769 | A1 * | 2/2007 | Eplee | B01D 53/06 |
| | | | | 95/113 |
| 2007/0166513 | A1 * | 7/2007 | Sheng | C09D 139/00 |
| | | | | 428/141 |
| 2008/0047239 | A1 | 2/2008 | Zheng et al. | |
| 2008/0110140 | A1 | 5/2008 | Egger | |
| 2008/0190853 | A1 | 8/2008 | Toma | |
| 2011/0088423 | A1 * | 4/2011 | Ieardi | C02F 1/14 |
| | | | | 62/291 |
| 2012/0205823 | A1 * | 8/2012 | Thielow | E03B 3/28 |
| | | | | 261/19 |
| 2013/0227879 | A1 * | 9/2013 | Lehky | B01D 53/14 |
| | | | | 96/240 |
| 2014/0007770 | A1 | 1/2014 | Gaebler | |
| 2014/0311887 | A1 * | 10/2014 | Boudeman | B01D 53/265 |
| | | | | 202/185.1 |
| 2016/0169574 | A1 * | 6/2016 | Jakovina | F25D 21/14 |
| | | | | 62/272 |
| 2017/0045284 | A1 | 2/2017 | Meuler et al. | |
| 2018/0147604 | A1 * | 5/2018 | Dai | B32B 3/30 |
| 2019/0030475 | A1 * | 1/2019 | Witchey | B64D 47/08 |

OTHER PUBLICATIONS

Mesfin M. Mekonnen et al., « Four billion people facing severe water scarcity, Science Advances, vol. 2, pp. e1500323 (1-6) (2016).
International Decade for Action 'Water for Life' 2005-2015. Retrieved Oct. 23, 2015, from http://www.un.org/waterforlifedecade/scarcity.shtml.
Ju, J., Bai, H., Zheng, Y., Zhao, T., Fang, R., & Jiang, L, "A multi-structural and multi-functional integrated fog collection system in cactus," Nature Communications, vol. 3, 1247, pp. 1-6 (2012).
Rohsenow, W. M., Hartnett, J. P. & Y.I. Cho. Handbook of heat transfer. Third ed., (McGraw Hill Publishers, 1998).
Rose, J. W., "Dropwise condensation theory and experiment: A review. Proceedings of the Institution of Mechanical Engineers Part A," Journal of Power and Energy, vol. 216, pp. 115-128, (2002).
Miljkovic, N., Enright, R., Nam, Y., Lopez, K., Dou, N., Sack, J. & Wang, E. N., "Jumping-droplet-enhanced condensation on scalable superhydrophobic nanostructured surfaces," Nano Lett, vol. 13, pp. 179-187 (2013).
Xiao, R., Miljkovic, N., Enright, R. & Wang, E. N., "Immersion condensation on oil-infused heterogeneous surfaces for enhanced heat transfer," Sci. Rep., vol. 3, 1988 (2013).
Daniel, S., Chaudhurry, M. K. & Chen, J. C., "Fast drop movements resulting from the phase change on a gradient surface," Science, vol. 291, pp. 633-636 (2001).
Mishchenko, L., Khan, M., Aizenberg, J. & Hatton, B. D., "Spatial control of condensation and freezing on superhydrophobic surfaces with hydrophilic patches," Adv. Funct. Mater., vol. 23, pp. 4577-4584 (2013).
Medici, M.-G., Mongruel, A., Royon, L. & Beysens, D. et al., « Edge effects on water droplet condensation, Phys. Rev. E, vol. 90, 062403, (2014).
Varanasi, K. K., Hsu, M., Bhate, N., Yang, W. S. & Deng, T., "Spatial control in the heterogeneous nucleation of water," Applied Physics Letters, vol. 95, 094101, (2009).
Paxson, A. T., Yague, J. L., Gleason, K. K. & Varanasi, K. K., "Stable dropwise condensation for enhancing heat transfer via the initiated chemical vapor deposition (iCVD) of grafted polymer films," Advanced Materials, vol. 26, pp. 418-423, (2014).
Narhe, R. D. & Beysens, D. A., "Nucleation and growth on a superhydrophobic grooved surface,". Physical Review Letters, vol. 93, No. 7, 076103, (2004).
Narhe, R. D. & Beysens, D., "A. Water condensation on a super-hydrophobic spike surface," Europhysics. Letters, vol. 75, No. 1, pp. 98-104, (2006).
Kim, H., Yang, S., Rao, S. R., Narayanan, S., Kapustin, E. A., Furukawa, H., Umans, A. S., Yaghi, O. M. & Wang, E. N., "Water harvesting from air with metal-organic frameworks powered by natural sunlight," Science, vol. 356, pp. 430-434, (2017).
Sharan, G., Clus, O., Singh, S., Muselli, M. & Beysens, D., "A very large dew and rain ridge collector in the Kutch area (Gujarat, India)," Journal of Hydrology, vol. 405, pp. 171-181, (2011).
Parker, A. R. & Lawrence, C. R., "Water capture by a desert beetle," Nature, vol. 414, pp. 33-34 (2001).
Klemm, O., Schemenauer, R. S., Lummerich, A., Cereceda, P., Marzol, V., Corell, D., van Heerden, J., Reinhard, D., Gherezghiher, T., Olivier, J., Osses, P., Sarsour, J., Frost, E., Estrela, M. J., Valiente, J. A. & Fessehaye, G. M., "Fog as a fresh-water resource: Overview and perspectives," Ambio, vol. 41, pp. 221-234, (2012).
Rivera, J. D. D., "Aerodynamic collection efficiency of fog water collectors," Atmos. Res., vol. 102, pp. 335-342 (2011).
Cereceda, P., Larrain, H., Osses, P., Faras, M. & Egana, I., "The spatial and temporal variability of fog and its relation to fog oases in the Atacama Desert, Chile," Atmos. Res., vol. 87, pp. 312-323, (2008).
Schemenauer, R. S. & Cereceda, P., "A proposed standard fog collector for use in high-elevation regions," J. Appl. Meteorol., vol. 33, pp. 1313-1322, (1994).
Schemenauer, R. S. & Joe, P. I., "The collection efficiency of a massive fog collector," Atmos. Res., vol. 24, pp. 53-69, (1989).
Lekouch, I., Muselli, M., Kabbachi, B., Ouazzani, J., Melnytchouk-Milimouk, I. & Beysens, D., "Dew, fog, and rain as supplementary sources of water in south-western Morocco," Energy, vol. 36, pp. 2257-2265, (2011).
Park, K.-C., Chhatre, S. S., Srinivasan, S., Cohen, R. E. & Mckinley, G. H., "Optimal design of permeable fiber network structures for fog harvesting," Langmuir, vol. 29, pp. 13269-13277, (2013).
Park, K.-C., Kim, P., Grinthal, A., He, N., Fox, D., Weaver, J. C. & Aizenberg, J., "Condensation on slippery asymmetric bumps," Nature, vol. 531, pp. 78-82, (2016).
Yao, Y., Aizenberg, J., & Park, K.-C., "Dropwise condensation on hydrophobic bumps and dimples," Applied Physics Letters, vol. 112, 151605, (2018).
Boreyko, J. B. & Chen, C.-H., "Self-propelled dropwise condensate on superhydrophobic surfaces," Physical Review Letters, vol. 103, 184501, (2009).

(56) References Cited

OTHER PUBLICATIONS

Miljkovic, N., Enright, R., Nam, Y., Lopez, K., Dou, N., Sack, J. & Wang, E. N., "Jumping-droplet-enhanced condensation on scalable superhydrophobic nanotextured surfaces," Nano Letters, vol. 13, pp. 179-187, (2013).

Fernandez, D. M., Torregrosa, A., Weiss-Penzias, P. S., Zhang, B. J., Sorensen, D., Cohen, R. E., McKinley, G. H., Kleingartner, J., Oliphant, A., Bowman, M., "Fog water collection effectiveness: Mesh intercomparisons," Aerosol and Air Quality Research, vol. 18, pp. 270-283 (2018).

Damak, M. & Varanasi, K. K., "Electrostatically driven fog collection using space charge injection," Science Advances, vol. 4, 5323 (2018).

Shi, W., Anderson, M. J., Tulkoff, J. B., Kennedy, B. S. & Boreyko, J. B., "Fog harvesting with harps," ACS Applied Materials & Interfaces, vol. 10. pp. 11979-11986, (2018).

Yu, T. S., Park, J., Lim, H., & Breuer, K. S., "Fog deposition and accumulation on smooth and textured hydrophobic surfaces," Langmuir, vol. 28, pp. 12771-12778, (2012).

Dai, X., Sun, N., Nielsen, S. O., Stogin, B. B., Wang, J., Yang, S., & Wong, T. S., "Hydrophilic directional slippery rough surfaces for water harvesting," Science Advances, vol. 4, eaaq0919, pp. 1-10, (2018).

World Health Organization, "Technical notes for emergencies: Minimum water quantity needed for domestic uses," New Delhi, pp. 1-4, (2005).

United Nations Educational Scientific and Cultural Organization; The United Nations World Water Development Report 2015: Water for a Sustainable World, Paris, (2015).

Arden Pope III, C. & Dockery, D. W., "Health effect of fine particulate air pollution: Lines that connect," J. Air & Waste Manage. Assoc., vol. 56, pp. 709-742, (2006).

U.S. Department of the Interior (U.S. Geological Survey), Estimated use of water in the United States in 2015, (2018).

Hoekstra, A. Y. & Mekonnen, M. M., "The water footprint of humanity," Proceedings of the National Academy of Sciences of the USA, vol. 109, No. 9, pp. 3232-3237, (2011).

Bornman, C. H., "Welwitschia mirabilis: paradox of the Namib Desert," Endeavour, vol. 31, pp. 95-99, (1972).

Pearson, H. H. W., "Some observations on Welwitschla mirabilis hooker," Phil. Trans. Royal Soc. London, B 198, pp. 265-304, (1906).

Kenneth A. Brakke, "The surface evolver," Exp. Math, vol. 1, pp. 141-165 (1992).

Park, K.-C. Choi, H. J., Chang, C.-H., Cohen, R. E., Mckinley, G. H. & Barbastathis, G., "Nanotextured silica surfaces with robust super-hydrophobicity and omnidirectional broadband super-transmissivity," ACS Nano, vol. 6, pp. 3789-3799, (2012).

Kim, J.-G. Choi, H. J., Park, K.-C., Cohen, R. E., McKinley, G. H., & Barbastathis, G., "Multifunctional inverted Nanocone arrays for non-wetting, self-cleaning transparent surface with high mechanical robustness," Small, vol. 10, pp. 2487-2494, (2014).

Choi, H. J., Park, K.-C. Lee, H., Crouzier, T., Rubner, M. F., Cohen, R. E., Barbastathis, G. & McKinley, G. H., "Superoleophilic titania nanoparticle coatings with fast fingerprint decomposition and high transparency," ACS Applied Materials & Interfaces, vol. 9. pp. 8354-8360, (2017).

Leclear, S., LeClear, J., Abhijeet, Park, K.-C. & Choi, W., "Drop impact on inclined superhydrophobic surfaces," J. Colloid Interface Sci., vol. 461, pp. 114-121, (2016).

Shih, C.-J. Wang, Q. H., Lin, S., Park, K.-C. Jin, Z., Strano, M. S. & Blankschtein, D., "Breakdown in the wetting transparency of graphene," Phys. Rev. Lett., vol. 109, 176101, (2012).

Srinivasan, S., Choi, W., Park, K.-C, Chhatre, S. S., Cohen, R. E. & McKinley, G. H., "Friction reduction for fluid flow on spray-coated non-wetting surfaces," Soft Matter, vol. 9, pp. 5691-5702, (2013).

Srinivasan, S., Chhatre, S. S., Guardado, J. O., Park, K.-C., Parker, A. R., Rubner, M. F., Mckinley, G. H. & Cohen, R. E., "Quantification of feather structure, wettability and resistance to liquid penetration," J. R. Soc. Interface, vol. 6, 20140287, (2014).

Zhao, H., Park, K.-C. & Law, K.-Y., "Effect of surface texturing on superoleophobicity, contact angle hysteresis, and robustness," Langmuir, vol. 28, pp. 14925-14934, (2012).

Chhatre, S. S., Choi, W., Tuteja, A., Park, K.-C., Mabry, J. M., McKinley, G. H. & Cohen, R. E., "Scale dependence of omniphobic mesh surfaces," Langmuir, vol. 26, pp. 4027-4035, (2010).

Moyuan Cao et al., "Hydrophobic/Hydrophilic cooperative Janus system for enhancement of fog collection," Small, 2015, vol. 11, pp. 4379-4384.

Hai Zhu et al., "High-efficiency water collection on biomimetic material with superwettable patterns," Chem. Commun. 2016, vol. 52, pp. 12415-12417.

Jie Liu et al., "Distinct ice patterns on solid surfaces with various wettabilities," Proc. Natl. Acad. Sci. U.S.A. 2017, vol. 114, pp. 11285-11290.

Jonathan B. Boreyko et al., "Delayed frost growth on jumping-drop superhydrophobic surfaces," ACS Nano, 2013, vol. 7, No. 2, pp. 1618-1627.

The International Search Report and Written Opinion issued on Nov. 4, 2019 for International Patent Application No. PCT/US19/45682, pp. 1-10.

\* cited by examiner

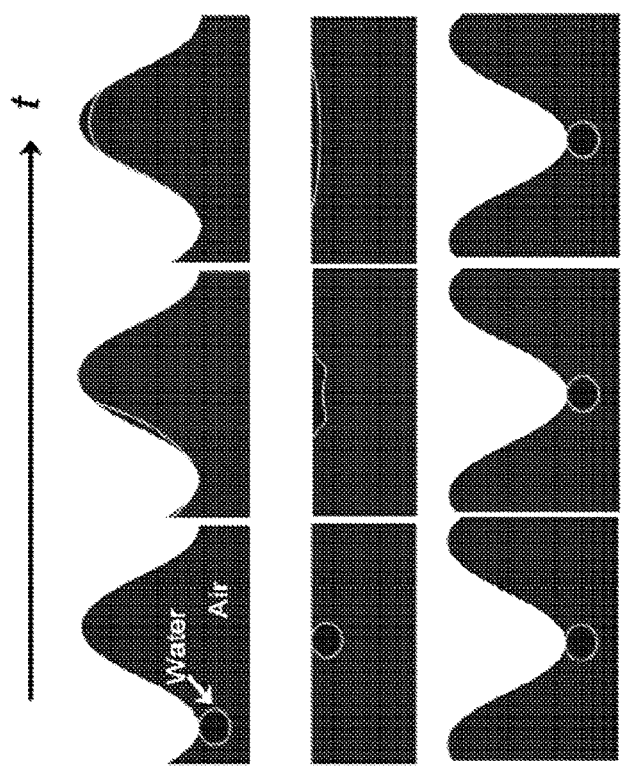
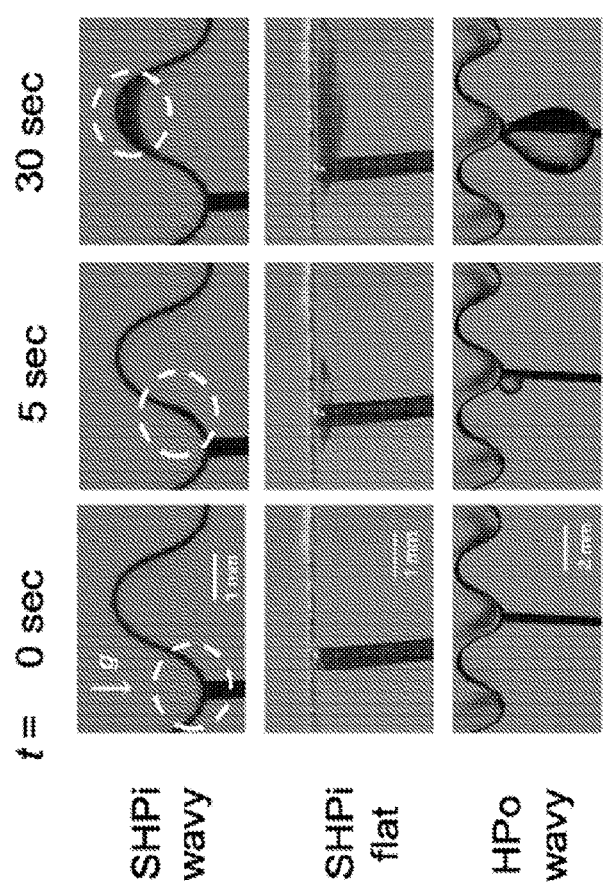
Fig. 3C
Fig. 3D

LIQUID COLLECTION ON WAVY SURFACES

CROSS-REFERENCE TO RELATED APPLICATION

This application is a National Stage of International Application No. PCT/US19/45682, filed Aug. 8, 2019, which claims the benefit of U.S. Patent Application No. 62/716,000, filed Aug. 8, 2018, the contents of which are herein incorporated by reference.

BACKGROUND

Liquid collection refers generally to the collection of a liquid (e.g., water) from both airborne liquid droplets and vapor that is present in the environment. Liquid collection has many applications in a variety of different environments and contexts. For example, there are many arid and semi-arid regions in the world that receive limited precipitation and that do not have access to underground water supplies. In such environments, liquid collection can be used to gather water from the air for drinking water, irrigation, livestock, etc. In addition to water harvesting, liquid collection techniques can also be used for cooling water recapture for sustainable electricity generation, dehumidifier systems, cooling systems for computers or electronics, toxic chemical mist elimination, etc.

SUMMARY

An illustrative system to collect liquid includes a wavy surface formed on a substrate, where the wavy surface includes a plurality of waves. The plurality of waves are configured to capture liquid from the air such that the liquid accumulates in valleys of the waves. The system also includes a liquid collection container configured to collect the liquid captured on the plurality of waves.

An illustrative method for collecting liquid includes directing air over a wavy surface that is formed on a substrate. The wavy surface includes a plurality of waves, and each wave in the plurality of waves includes a peak and a valley. The method also includes capturing liquid from the air on the wavy surface such that the liquid accumulates in the valleys of the plurality of waves. The method further includes collecting the liquid in a liquid collection container.

An illustrative method for forming a liquid collection system includes determining, based on a desired liquid collection rate, one or more wave characteristics for a wavy surface pattern. The method also includes forming the wavy surface pattern on a substrate such that the wavy surface has the one or more wave characteristics. The method further includes positioning a liquid collection container relative to the wavy surface pattern such that the liquid collection container collects liquid that is deposited on the wavy surface pattern.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3C compares the dynamics of water infused onto surfaces with various geometries and wettabilities by a syringe pump at a constant rate of 2 µL/sec in accordance with an illustrative embodiment.

FIG. 3D further depicts the influence of surface wettability and geometry on the liquid transport based on a simulation of the fluid dynamics of water on a given substrate in accordance with an illustrative embodiment.

DETAILED DESCRIPTION

Figure 1:
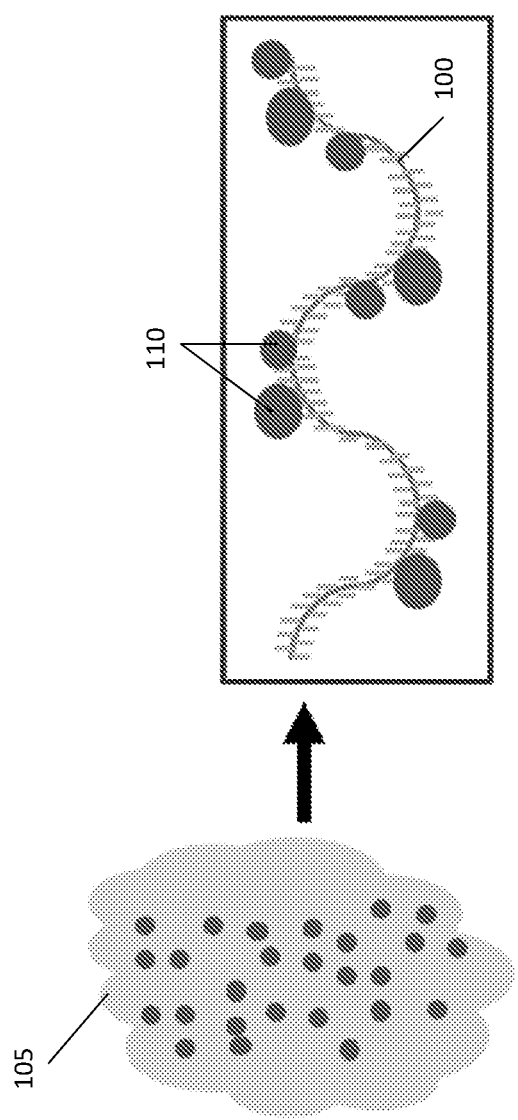
FIG. 1 is a schematic that depicts liquid collection with a multiscale wavy surface in accordance with an illustrative embodiment.

It has been well documented that fog (airborne water microdroplets) and dew (condensed water droplets on surfaces) often co-exist in nature. Also found in nature are plants and animals that have water harvesting abilities which can extract the dew and/or capture the fog. In studying these phenomena, the inventors identified and studied the hierarchical wavy surface structure found on the unique plant *Welwitschia mirabilis*, which is a plant that typically lives for up to 2,000 years in the Namib Desert. Ever since the first scientific work by an Austrian researcher Dr. Welwitsch, this plant has been known for its long lifespan and interesting strategy for surviving in this arid region-water harvesting. From the macroscopic observation and scanning electron microscopy of *Welwitschia* leaf samples from actual plants (3-5 years old), the inventors identified hierarchical wavy surface structures from micro to millimeter scale that induce capture of airborne water droplets and directional transport of captured water along the micro/milli-grooves.

Described herein are liquid collection techniques and systems utilizing artificial multiscale wavy surfaces that are at least partly bio-inspired from the two-phase flow around multiscale, wavy leaf surfaces. The description below (i) introduces the impact of humidity, air velocity, and droplet size on fog and vapor water capture, (ii) considers loss mechanisms for a variety of liquids, and (iii) integrates transport mechanisms to produce a unified framework of continuous, generalized liquid collection. The proposed embodiments do not simply find a way to collect liquid using a material that is effective for a type of atmospheric water source or part of the entire liquid collection process, but rather combine important scientific principles associated with capture, loss, and transport of a broad range of liquids on multiscale textured wavy surfaces.

The proposed embodiments focus on surface design of multiscale wavy surfaces that affects the three major steps of liquid collection—capture, loss, and transport. As discussed in more detail below, by synergistically integrating the principles for improved capture, loss, and transport mechanisms, it is possible to optimize liquid collection systems for solving a wide range of problems associated with water, environmental, and energy issues. The various embodiments described herein do not depend on specific materials and expensive nanofabrication, are relatively easy to fabricate and scale up, and can be optimized to enhance the energy efficiency compared to existing systems. Additionally, the proposed systems are characterized in that both sides of the wavy surface can be used and integrated into existing condensation and mist elimination systems.

The proposed systems and methods are also based in part on the following observations about complex liquid capture, loss, and transport mechanisms on multiscale wavy surfaces. First, it has been determined that the complex water capture from airborne droplets and vapor can be enhanced by a macroscopic wavy surface structure that induces local circulation and focused diffusion flux. The wavy surface can also include a microscopic texture that influences complex flow near the textured surface and capillary condensation. Second, by expanding the range of liquids from water to other low surface tension liquids, the inventors also examined how to minimize the loss of collected liquids by re-entrainment and evaporation when the collected liquid is located on the valley regions of such a wavy surface structure. Third, the inventors have determined that collected liquid can be self-transported from the ridges to valleys of the wavy surface due to the pressure difference created by the capillary effect (and further enhanced by the gravitational force). By controlling and manipulating these characteristics, systems for efficient liquid collection can be realized, along with the ability to accurately map droplet and vapor capture, loss, and transport during the liquid collection process.

As described herein, the proposed methods and systems are valuable because they (1) increase the efficiency of the liquid capture rate of wavy surfaces compared to flat surfaces, (2) decrease the loss of captured liquid by spontaneous self-transporting the captured liquid to the valley region where evaporation and re-entrainment rates are low, and (3) optimize multiscale surface textures to enhance the overall liquid collection rate depending on the two-phase flow conditions.

FIG. 1 is a schematic that depicts liquid collection with a multiscale wavy surface 100 in accordance with an illustrative embodiment. As shown, liquid droplets and vapor from the air 105 deposit liquid 110 on both sides of the multiscale wavy surface 100 as the air flows over the surface. The liquid can be water or any other substance that is present as a liquid/vapor in the air. For example, in addition to water, the liquid can be hydrochloric acid, sulfuric acid, other acids, bases, gases/liquids that induce cancer and other medical issues, etc. With regard to such other liquids, mist elimination processes in the chemical industry can use the proposed system as most chemicals will wet a wavy surface made of metallic, polymeric, and ceramic surfaces.

Figure 2:
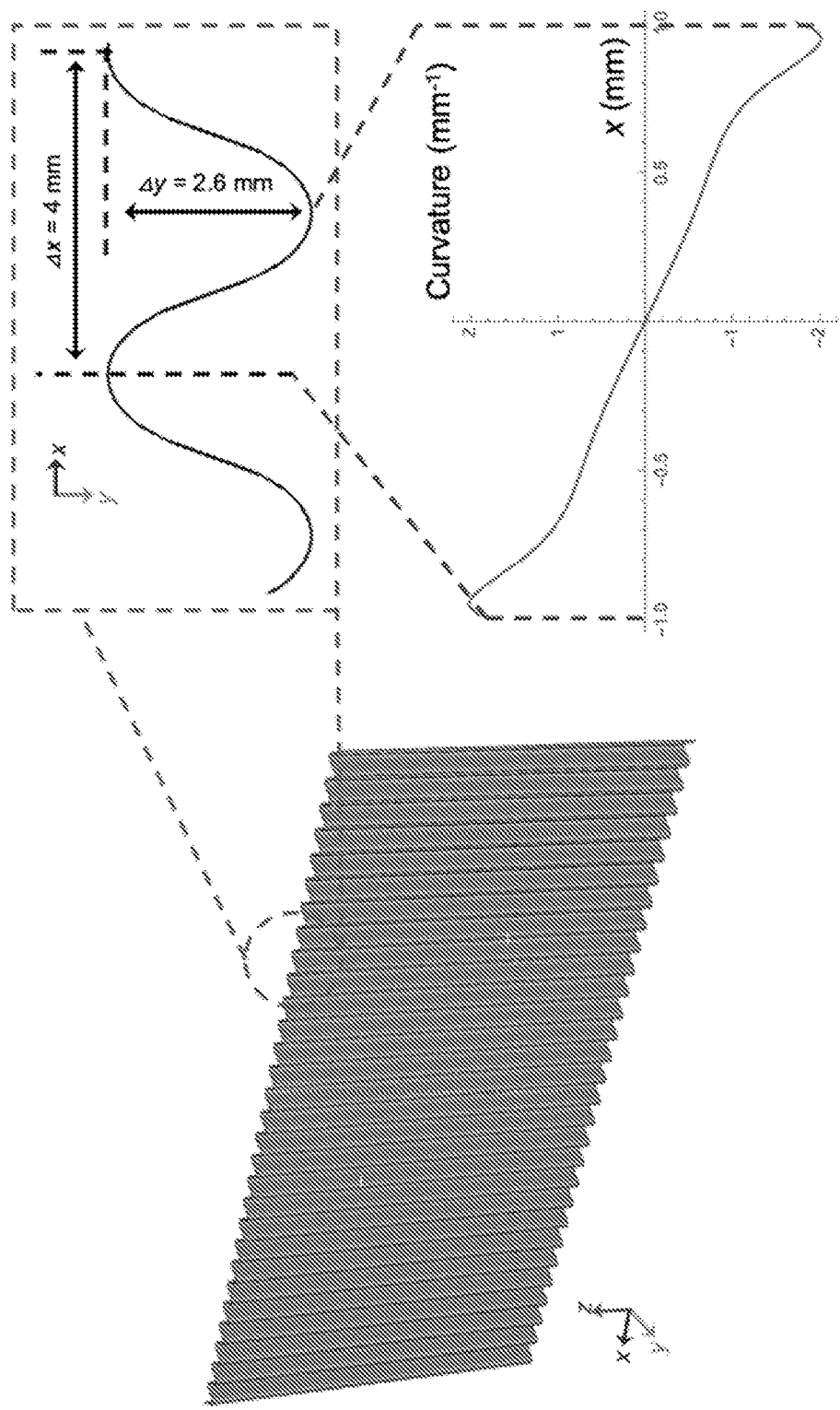
FIG. 2 depicts an artificial wavy surface, along with its cross-sectional view and the curvature gradient of the two-dimensional curve between the peak and valley in accordance with an illustrative embodiment.

As discussed above, this configuration was inspired in part by the wavy surface characteristics of the *Welwitschia mirabilis* plant. FIG. 2 depicts an artificial wavy surface, along with its cross-sectional view and the curvature gradient of the two-dimensional curve between the peak and valley in accordance with an illustrative embodiment. As shown, the curvature gradient (lower right) is with respect to the peak positioned at $x=-1$ millimeter (mm) and the valley that is positioned at $x=1$ mm in the cross-sectional view (upper right). The artificial wavy surface can be made from a variety of different materials such as aluminum, stainless steel, copper, plastic, silicon, carbon fiber, etc. Additionally, the artificial wavy surface can be made using any technique(s) known in the art.

In one embodiment, the artificial wavy surface is constructed from aluminum (e.g., Al 1100, 0.076 mm thick), and is formed using molds. The molds can be formed by three-dimensional (3D) printing, but can also be fabricated using alternative procedures. In an illustrative embodiment, a pair of molds are 3D printed to include a desired wavy surface pattern. The surface pattern is then transferred to a substrate (e.g., aluminum) by pressing the substrate in between the molds such that the substrate conforms to the wavy surface pattern of the molds. In alternative embodiments, the substrate can be 3D printed, injection molded, thermally molded using a single mold, physically bent, etc. to impart a desired wavy surface pattern thereon.

In some embodiments, the wavy surface can be in the form of a patterned aluminum surface that is intrinsically hydrophilic with a water contact angle of 81°. The patterned samples can be cleaned by oxygen plasma for 2 minutes (or any other technique) to remove any organic contaminants. The surface wettability can be varied by chemical coating in solution, and/or by nano-texturing via boiling or another process. As an example, nanoscale textures can be obtained on an aluminum surface by boiling the cleaned surface in water for 30 minutes to undergo the boehmitization process. A hydrophobic coating can be applied to the surface by immersing the cleaned samples in 1 wt. % solution of fluoroaliphatic phosphate ester fluorosurfactant (FS-100, Pilot Chemical) in ethanol at 70° C. for 30 minutes. Alternatively, a different technique may be used to impart a hydrophobic coating. The combination of coating and nano-texture yields four different surface wettabilities, namely a hydrophilic (HPi) surface (no coating or texture), a superhydrophilic (SHPi) surface (no coating, with nano-texture), a hydrophobic (HPo) surface (a hydrophobic coating with no texture), and a superhydrophobic (SHPo) surface (a hydrophobic coating and nano-texture).

Figure 3A:
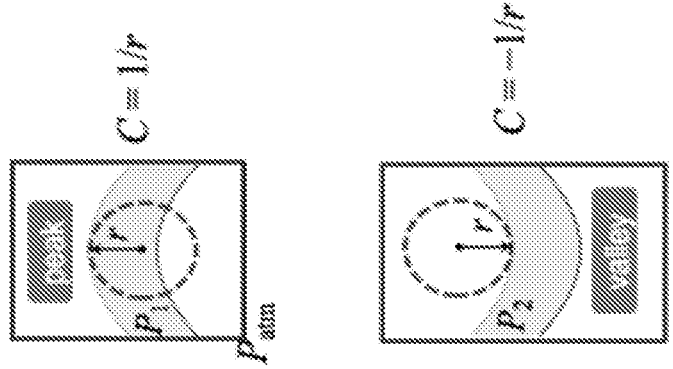
FIG. 3A depicts schematics of the spontaneous liquid transport on a wavy surface driven by Laplace pressure gradient in accordance with an illustrative embodiment.
Figure 3A:
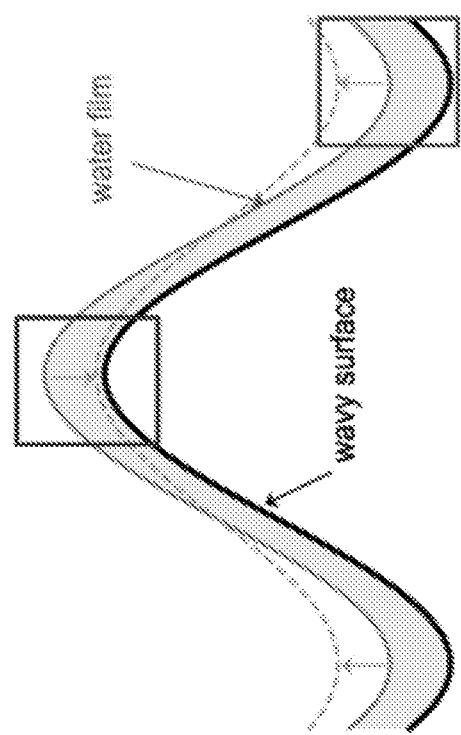

In an illustrative embodiment, the wavy surface pattern is designed to maximize the liquid transport driven by the capillary interfacial forces. It is known that liquid droplet motion can be triggered by the surface curvature gradient. Specifically, droplets spontaneously move from a topographically convex location (positive mean curvature) to a concave one (negative mean curvature) to minimize the total interfacial energy as shown in FIG. 3A. Specifically, FIG. 3A depicts schematics of the spontaneous liquid transport on a wavy surface driven by the Laplace pressure gradient in accordance with an illustrative embodiment. In FIG. 3A, the inset on the upper right depicts the curvature at the peak and the inset on the lower right depicts the curvature at the valley. Using the Young-Laplace equation ($\Delta P = P_{in} - P_{out} = \gamma C$) and still referring to FIG. 3A, it can be shown that $$P_1 (\text{i.e., at the peak}) = P_{atmosphere} + \frac{\gamma}{r} > P_2 (\text{i.e., at the valley}) = P_{atmosphere} - \frac{\gamma}{r}.$$

This implies that flow occurs from the peak to the valley.

In the light of this mechanism in which droplets spontaneously move from a topographically convex location to a concave location, the inventors designed the cross-sectional profile (in the x-y plane) by assuming an almost-constant Laplace pressure gradient across the surface, as shown by the near constant slope of curvature vs. position in the lower right side of FIG. 2. This yields a periodic wavy profile, with a peak-to-peak distance ($\Delta x$) of 4 mm and an amplitude ($\Delta y$) of about 2.6 mm. In alternative embodiments, different dimensions may be used.

Figure 3B:
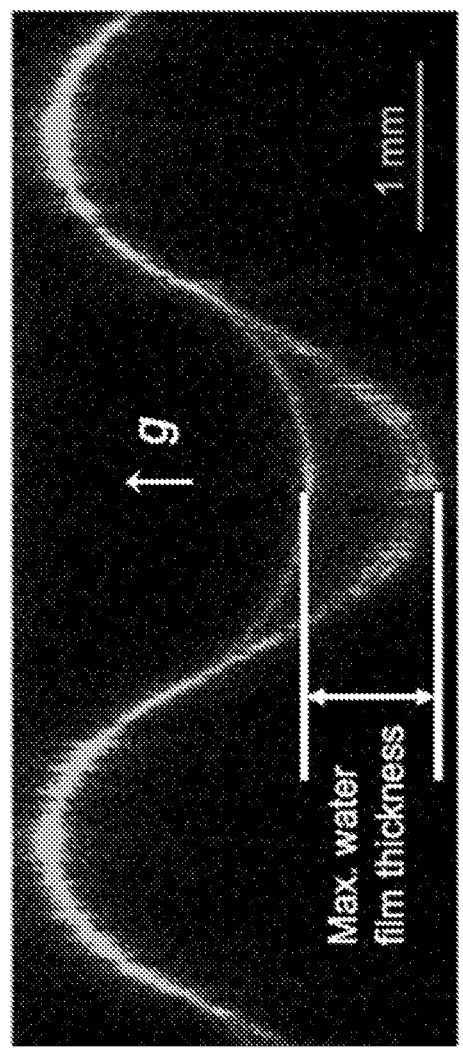
FIG. 3B shows the equilibrium profile (i.e., shape of the water meniscus) on a superhydrophilic wavy surface observed under a confocal microscope in accordance with an illustrative embodiment.

As discussed above, the equilibrium liquid shape on a surface depends on both its wettability and geometry. FIG. 3B shows the equilibrium profile (i.e., shape of the water meniscus) on a superhydrophilic wavy surface observed under a confocal microscope in accordance with an illustrative embodiment. As shown, water preferentially resides in the valley to reduce the total liquid-air surface area. The synergistic effect between surface wettability and surface geometry was further investigated by performing controlled experiments.

FIG. 3C compares the dynamics of water infused onto surfaces with various geometries and wettabilities by a syringe pump at a constant rate of 2 microliters/second ($\mu$L/sec) in accordance with an illustrative embodiment. Specifically, FIG. 3C shows liquid dynamics of water infused onto the peak (bottom side) of a superhydrophilic wavy surface, a superhydrophilic flat surface, and the peak of a hydrophobic wavy surface. On the superhydrophilic wavy surface, as indicated by the dashed circles in FIG. 3C, water spontaneously spreads from the peak (bottom side) to the next valley (top side) against gravity with negligible water film thickness at the peak. When the wavy geometry is absent and surface becomes flat, water grows larger in size with an appreciable maximum liquid thickness due to limited driving force of liquid motion. On a hydrophobic wavy surface, however, droplets grow at the infusing point (needle) without moving to the valley. FIG. 3C is a time lapse diagram that depicts liquid dynamics at t=0 seconds, 5 seconds, and 30 seconds for each of the 3 surfaces.

FIG. 3D further depicts the influence of surface wettability and geometry on the liquid transport based on a simulation of the fluid dynamics of water on a given substrate in accordance with an illustrative embodiment. FIG. 3D also shows droplet/film dynamics over time. The uppermost figures represent an SHPi wavy surface, the middle figures represent an SHPi flat surface, and the bottom figures represent an HPo wavy surface. In FIG. 3D, the simulations were performed based on the level set method (i.e., bottom side of the surfaces only).

The inventors have conducted numerous experiments regarding the performance of the proposed wavy surfaces for condensation of water. In the presence of non-condensable gases (NCGs) such as air, the condensation rate primarily depends on three factors: i) the nucleation rate of water, ii) the diffusion of water vapor in the gas phase, and iii) liquid removal on the solid surface. Under a substantial supersaturation of humidity relative to the surface temperature, where nucleation of water is fast, the condensation rate is limited by diffusion and water shedding. The rate of condensation rate is both a diffusion-limited process as well as a heat transfer limited process, since water is much more thermally insulating as compared to metallic surfaces (i.e., by about 2 orders of magnitude in heat resistivity).

The effect of the surface geometry on diffusion of water vapor in the air was first compared between a wavy surface and a flat surface, both of which were hydrophobic for visualization purposes. FIG. 4A shows the distribution of droplet sizes on a hydrophobic (HPo) flat surface and an HPo wavy surface in accordance with an illustrative embodiment. The surface temperature was maintained at 1° C., and the relative humidity in the ambient air was 80% at 23° C. While the droplets are more uniform in size with an average diameter of 0.13±0.02 mm after 20 min of condensation, the droplets show much larger sizes (0.19±0.02 mm) on the peak, and much smaller sizes (less than 0.05 mm in diameter) in the valley of the wavy surface.

Figure 4B:
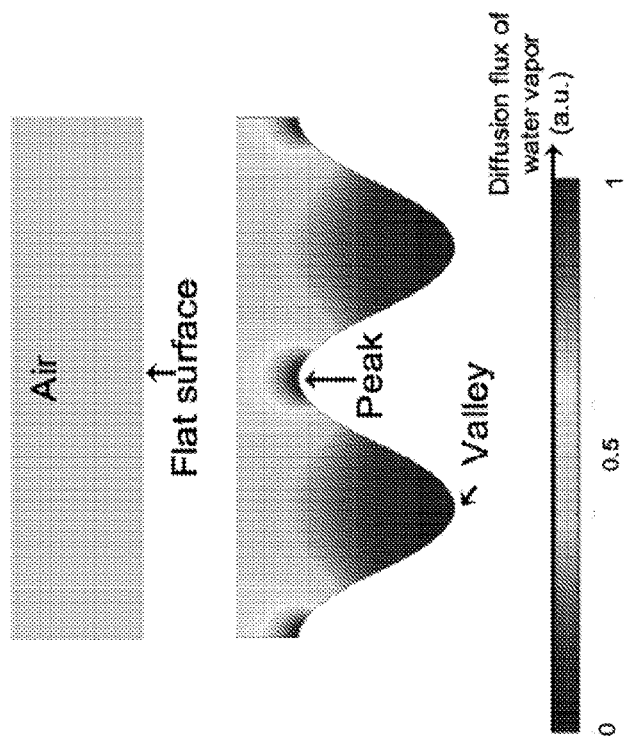
FIG. 4B depicts the simulation of the diffusion flux of water vapor on the top side of flat and wavy surfaces in accordance with an illustrative embodiment.
Figure 4A:
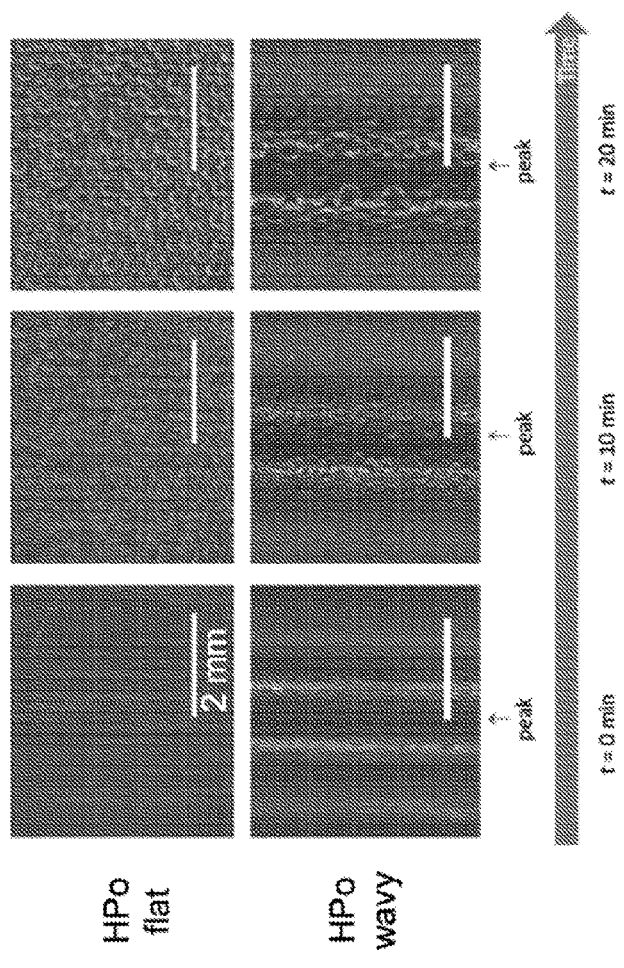
FIG. 4A shows the distribution of droplet sizes on a hydrophobic (HPo) flat surface and an HPo wavy surface in accordance with an illustrative embodiment.

Further investigation revealed that the mass transport of water vapor by diffusion in the air phase is significantly influenced by the surface geometry, as shown in FIG. 4B. Specifically, FIG. 4B depicts the simulation of the diffusion flux of water vapor on the top side of flat and wavy surfaces in accordance with an illustrative embodiment. Compared to the uniform diffusion flux on the flat surface, the wavy surface shows a greater magnitude of incoming diffusion flux on the peaks which are convex to the air, and a smaller magnitude of diffusion flux in the valleys which are concave to the air. This simulation result is consistent with the droplet size distribution observed in FIG. 4A.

Figure 4C:
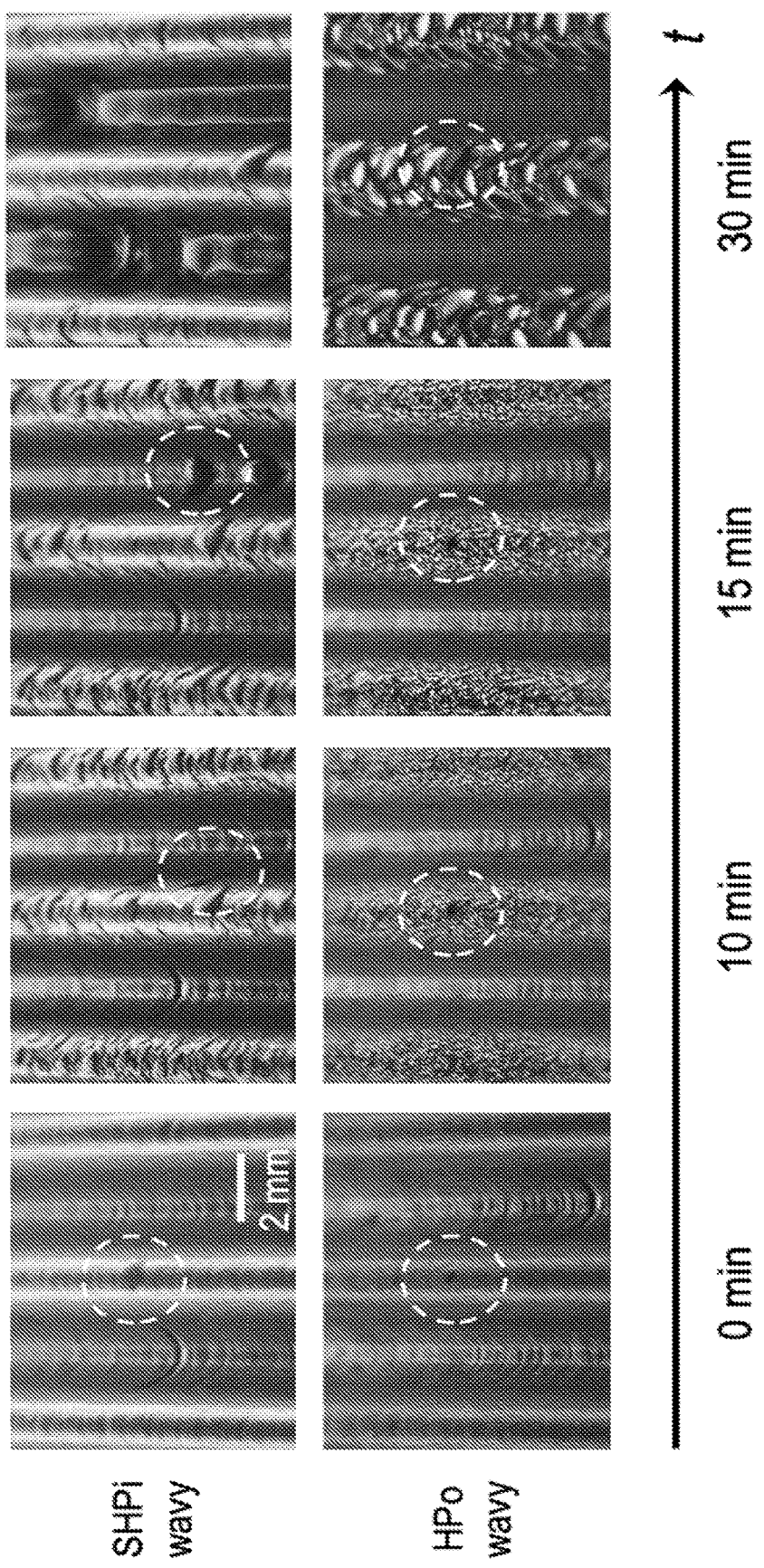
FIG. 4C depicts the condensation on superhydrophilic and hydrophobic wavy surfaces in accordance with an illustrative embodiment.

Combining the effects of diffusion and water transport yields a significant impact on the overall condensation rate. FIG. 4C depicts the condensation on superhydrophilic and hydrophobic wavy surfaces in accordance with an illustrative embodiment. In FIG. 4C, the dashed circles indicate the motion of condensed droplets. Under the surface temperature of 1° C. and ambient humidity of 80° C. at 23° C., water first condensed on the peaks for both surfaces regardless of the wettability. On the superhydrophilic surface, condensed water quickly spread out from the peak and gradually moved toward the valley as the droplets grew in size. On the hydrophobic surface, however, the condensed droplets are pinned at the peaks due to the lack of driving forces for motion. The droplet moves as condensation happens and continues on both surfaces are indicated by the dashed circles in FIG. 4C, where the peaks of both surfaces were dyed for better visualization. After 30 minutes of condensation, above 90% of the peak area of the superhydrophilic wavy surface was recovered from the condensate coverage as compared to 10 minutes of condensation, while almost 100% of the peak area of the hydrophobic wavy surface was still covered by water.

Figure 4D:
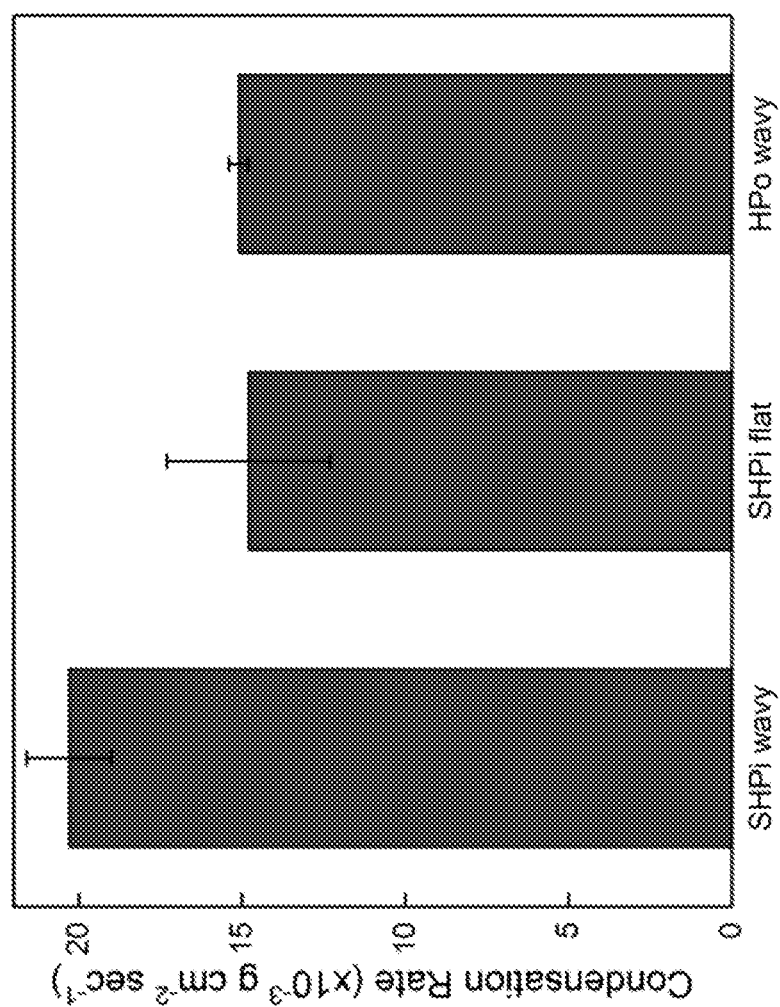
FIG. 4D compares the condensation rate of a superhydrophilic wavy surface, a superhydrophilic flat surface, and a hydrophobic wavy surface in accordance with an illustrative embodiment.

FIG. 4C thus shows how condensate is quickly transported from the peak to the valley on the superhydrophilic surface, whereas droplets were pinned at the peaks on the hydrophobic surface, thereby hindering heat transfer. Since the peaks are crucial with respect to obtaining efficient condensation, the superhydrophilic wavy surface outperforms the hydrophobic wavy surface and the superhydrophilic flat surface by around 30%, as shown in FIG. 4D. Specifically, FIG. 4D compares the condensation rate of a superhydrophilic wavy surface, a superhydrophilic flat surface, and a hydrophobic wavy surface in accordance with an illustrative embodiment. In the comparison of FIG. 4D, all samples were 4.2 centimeters (cm)×7.8 cm in size, and data for each sample was collected by averaging the results of 3 experiments, each of which spanned 3 hours. The surface temperature was kept at 1° C., and ambient humidity was 80% at 23° C.

Figures 5A, 5B:
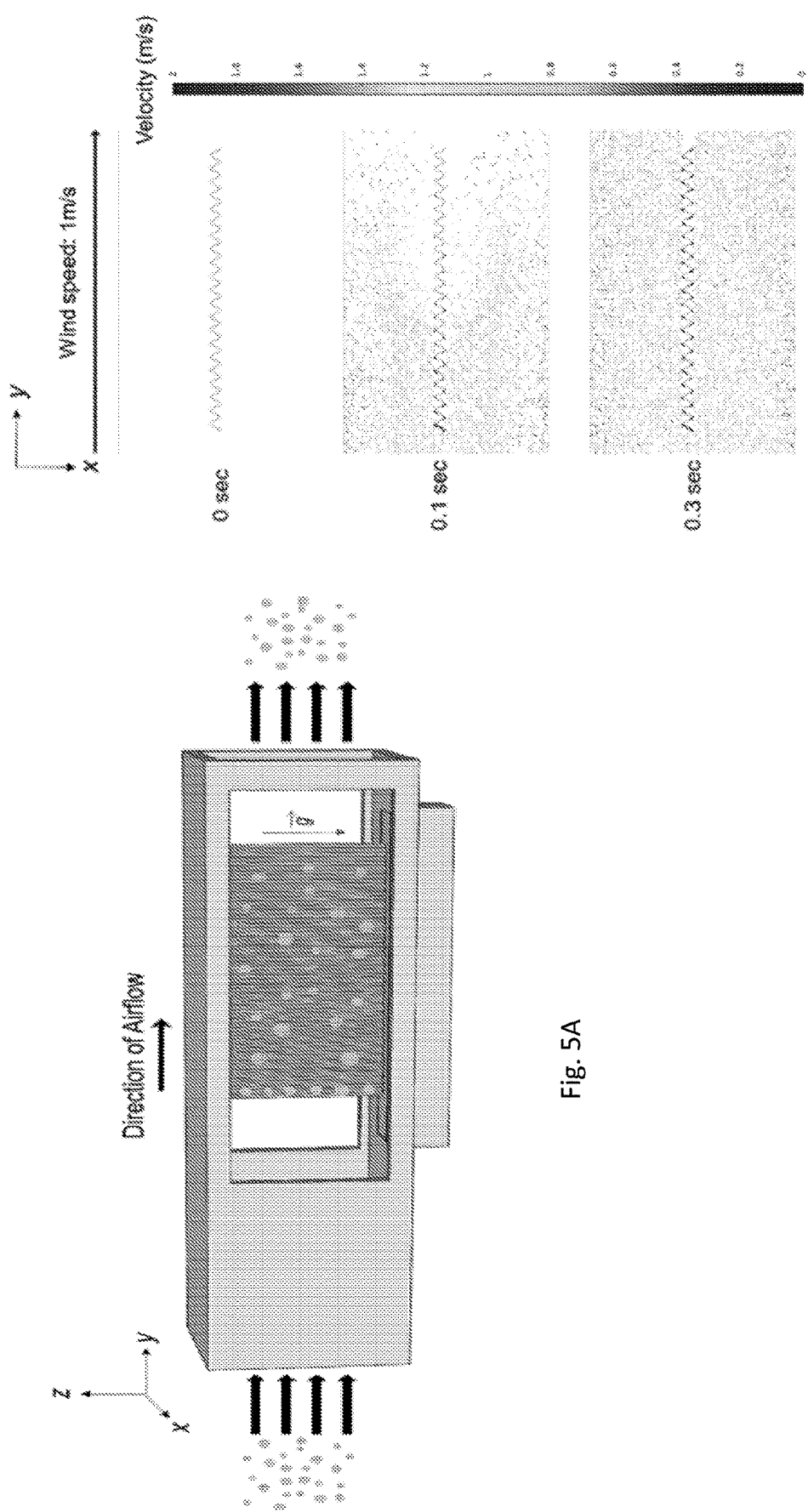
FIG. 5A depicts a liquid collection system in accordance with an illustrative embodiment.
FIG. 5B depicts simulation results of fog particle trajectory near a wavy surface in accordance with an illustrative embodiment.

In another experiment, a custom designed liquid collection system was designed. A housing (in the form of a wind tunnel) was 3D printed, and air flow through the wind tunnel was generated using an AC-powered fan attached at the outlet of the tunnel. The fan was powered using a variable voltage transformer such that the input voltage was adjustable and the fan was able to produce three different wind speeds: 1 meters/second (m/s), 2 m/s, and 3 m/s. Alternatively, a fan may not be used and the system may receive air through wind and natural air currents. At the inlet of the wind tunnel was a flow stabilizer and a commercial humidifier producing fog droplets of deionized water with diameters ranging between 5 and 40 micrometers (μm). Wavy surfaces with varying wettabilities were placed parallel to the incoming fog-laden airflow. FIG. 5A depicts the liquid collection system in accordance with an illustrative embodiment. This wind tunnel was used for testing wavy and flat surfaces of varying wettability. The wind tunnel, or variations thereof, can also be used as a liquid collection system that can be incorporated into an existing collection system or used as a standalone liquid collecting system to perform any of the applications described herein.

In the experiments using the liquid collection system depicted in FIG. 5A, water deposited on the surfaces was transported downwards in the direction of gravity to a collection apparatus (sponge-like material). Experiments were run for each surface at the three aforementioned wind speeds for 30 minutes in a high humidity environment (RH 95%) to reduce the effects of convective evaporation. The mass of the apparatus was measured before and after the completion of the experiments. The results produced average fog collection rates over 30 minutes and were compared against flat surfaces with the same projected surface area.

Figure 5C:
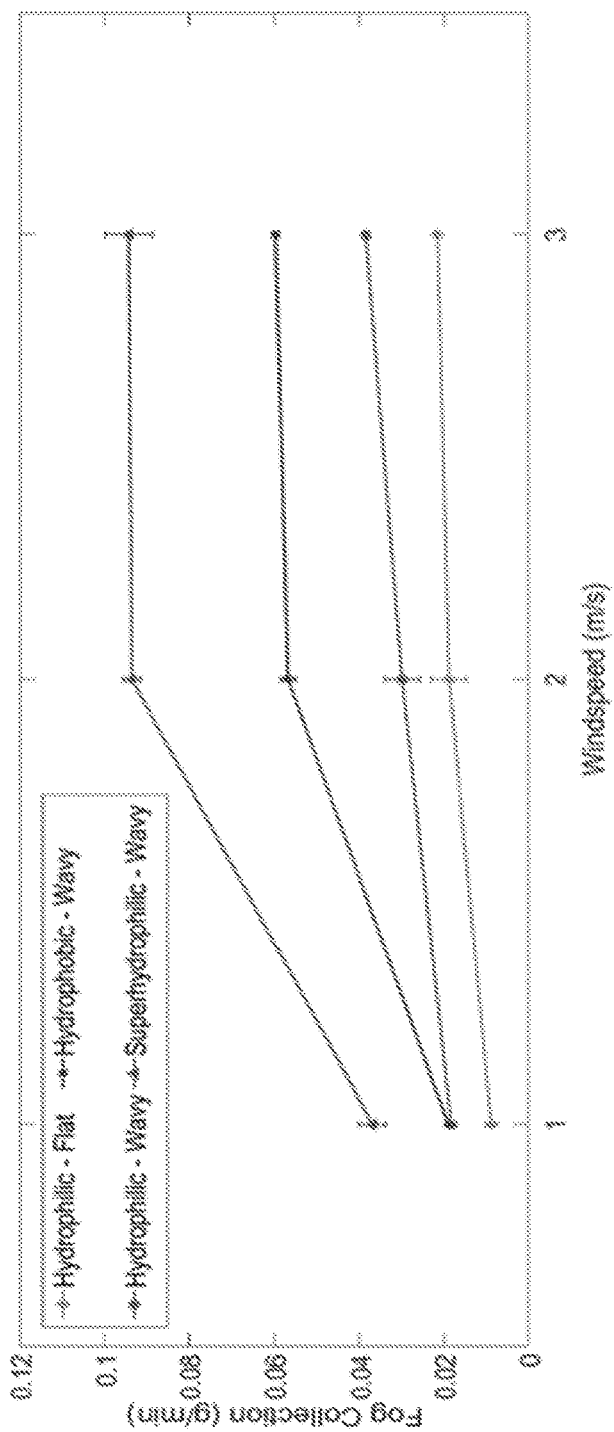
FIG. 5C depicts experimental results of fog collection rate for a flat surface and wavy surfaces with various wettabilities in accordance with an illustrative embodiment.

FIG. 5B depicts simulation results of fog particle trajectory near a wavy surface in accordance with an illustrative embodiment. The simulation results show enhanced droplet deposition on the peaks of the waves. The speed of the droplets is represented by their shade, in accordance with the legend. Also, the dots on the wavy surface represent deposited fog droplets. FIG. 5C depicts experimental results of fog collection rate for a flat surface and wavy surfaces with various wettabilities in accordance with an illustrative embodiment. As shown, the supherydrophilic wavy surfaces have the highest fog collection performance of any wettability or geometry tested.

Figure 5D:
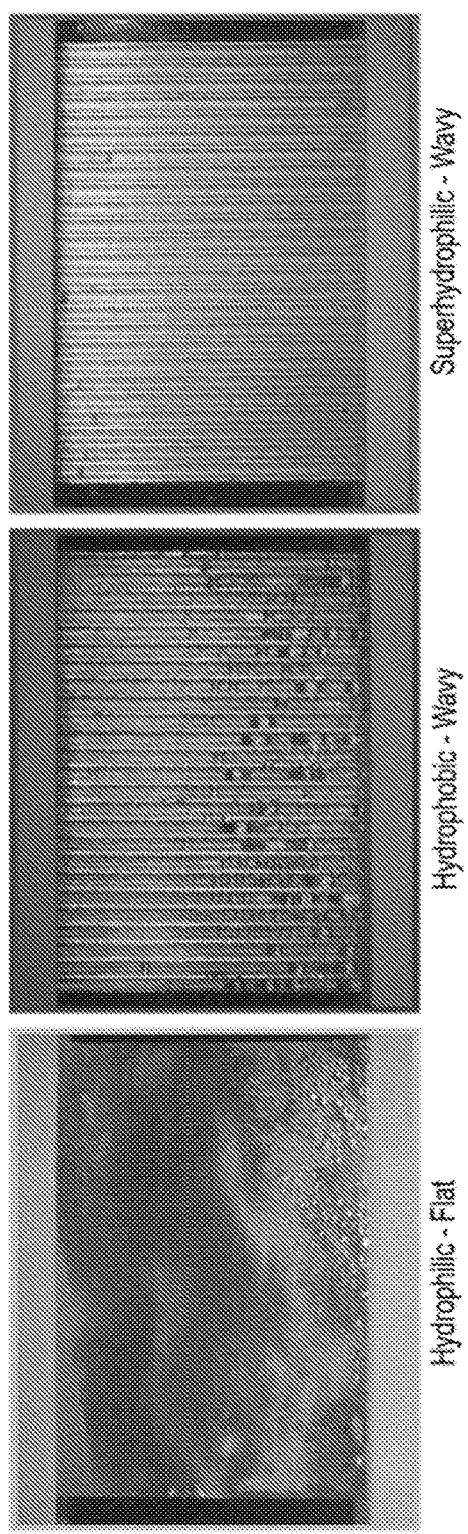
FIG. 5D depicts experimentally obtained images that show significantly more droplet deposition on wavy surfaces as compared with flat surfaces in accordance with an illustrative embodiment.

Still referring to FIG. 5B, the simulation over time reveals fog droplets deposited evenly over the peaks of the wavy surface, while the valleys remain dry. FIG. 5D depicts experimentally obtained images that show significantly more droplet deposition on wavy surfaces as compared with flat surfaces in accordance with an illustrative embodiment. The simulation results are consistent with the observed experimental results. The incoming fog droplets initially impact the peaks of the wavy surfaces, grow in size, transport into the valleys, and then finally transport downwards to the collector. For the hydrophobic wavy surfaces, individual droplet growth and transport is observable. For the superhydrophilic wavy surfaces, on the contrary, the impacting droplets are immediately spread into a thin film and transported downwards towards the collector. The superhydrophilic surface therefore shows no observable droplets deposited on its surface because the deposited droplets immediately form the thin film that allows for more efficient droplet transport.

The aforementioned differences in surface types and shapes are evident in the average fog collection rates of the various surfaces, shown in FIG. 5C. Two main conclusions can be derived from FIG. 5C: i) wavy surfaces exhibit increased fog collection rates relative to flat surfaces, and ii) superhydrophilic wavy surfaces exhibit greater fog collection performance than hydrophilic or hydrophobic wavy surfaces. The differences in fog collection performance become more pronounced at higher windspeeds as the deposition efficiency of fog droplets increases. This data can be used to design more efficient liquid collection systems for use in any of a number of applications.

Traditional liquid collection systems are unable to achieve the efficiency and cost-effectiveness of the proposed phase change and liquid collection methods described herein. The proposed technology can be used in applications such as atmospheric water generators, thermal power plants, cooling systems for supercomputers, microfluidic systems for biomedical/healthcare applications, marine biofouling reduction systems, food-energy-water production systems, water desalination/purification systems, fuel processing, mist elimination systems, energy efficient dehumidification systems, material deposition processes based on phase change, general chemical distillation, residential/commercial HVAC systems, inkjet printing systems, functional lens surfaces for robotics/sensors, systems for reducing contamination on touchscreens, etc.

In an illustrative embodiment, any of the aforementioned applications can be implemented in part by designing a liquid collecting surface as described herein. The liquid collecting surface can be formed from a substrate, which can be made from aluminum, plastic, stainless steel, copper, silicon, etc. In some embodiments, the substrate can be a flat sheet of material. The substrate is transformed into a wavy surface that includes one or more waves, each of which has a peak and a valley. In an illustrative embodiment, the peaks and valleys that form the waves are curved surfaces such that a cross-sectional view of the wavy surface has the general appearance of a sine wave with near-constant curvature. In an alternative embodiment, the peaks and/or valleys that form the waves can be pointed surfaces such that a cross-sectional view has the appearance of interconnected straight lines.

The waves can be formed on the entire substrate, or on just one or more portions of the overall substrate. In such an embodiment, the one or more portions of the substrate without waves can be a flat surface. Additionally, a single substrate can include a plurality of different types of waves. The different types of waves can be on the same side of the substrate or on opposite sides of the substrate. The different types of waves can have different water contact angles, different curvature, different amplitude, different peak-to-peak distances, different coatings, etc.

In some embodiments, the wavy surface is formed on a single side of the substrate such that the substrate has both a flat side and a wavy surface that is opposite the flat side. Alternatively, the wavy surface can be formed on both sides of the substrate. Whether the surface is wavy on both sides or just one side can be determined based on the application.

As an example, in applications where the goal is to maximize liquid collection (e.g., a water harvesting system), the wavy surface can be imparted on both sides of the substrate such that both sides maximally contribute to the liquid collection. In other more targeted embodiments, such as electronics cooling, only a single side of the substrate may be formed into a wavy surface.

A peak-to-peak distance ($\Delta x$) and/or amplitude ($\Delta y$) of waves that form the wavy surface can also be controlled depending on the application and desired liquid collection attributes of the system. For example, a large scale system may include larger waves and a small scale system can include smaller waves. Additionally, the peak-to-peak distance and the amplitude can be used to control the curvature of the waves, which as discussed above affects how the collected liquid interacts with the surface and the rate at which liquid accumulates in the valleys. Controlling the curvature (via the peak-to-peak distance and/or amplitude) can therefore be used to control the rate of liquid accumulation in the valleys for the system.

The substrate can be formed into the wavy surface using any fabrication techniques known in the art. In one embodiment, a pair of molds can be 3D printed, where the molds include the desired wavy surface pattern(s). The substrate can be pressed in between the molds such that the substrate takes on the wavy surface pattern(s). Alternatively, the substrate can be a melted substance that is poured into a mold that includes the desired wavy surface pattern(s). In another alternative embodiment, a custom machine can be used to bend the substrate to form the wavy surface pattern(s) thereon. The bending can be performed in the presence of heat to make the substrate more malleable.

A texture (e.g., nano-texture), coating, or process can also be applied to the substrate, before or after the substrate is manipulated to include the wavy surface pattern(s). Any texture, coating, or process known in the art may be used. The texture, coating, or process can be used to impart hydrophobic, superhydrophobic, hydrophilic, or superhydrophilic properties to the wavy surface pattern, which can be used to control the water contact angle of the surface. As discussed above, these properties help dictate the amount of liquid that the system is able to collect and the rate at which collected liquid accumulates in the valleys. In some embodiments, different portions of the wavy surface can be formed to include different properties. For example, a first portion of the wavy surface can be hydrophobic and a second portion of the wavy surface can be superhydrophilic to control the collection rates of the different portions of the surface. In such an embodiment, the hydrophobic surface can be on one side of the substrate and the superhydrophilic surface can be on the other (opposite) side of the substrate. The wavy surface can be manipulated such that either the hydrophobic surface side or the superhydrophilic surface side is facing an incoming air flow, depending on the current water accumulation needs of the system.

The system may also utilize a fan or other air movement system to direct air over the liquid collecting surface. As a result, more air will pass over the liquid collecting surface, resulting in more collected liquid. Alternatively, a fan may not be used and the system can rely on wind and air current to move air across the surface. The system can also include a liquid collection container that is designed to collect the liquid from the wavy surface. The liquid collection container can be a simple receptacle into which the water flows or is directed from the wavy surface. In some embodiments, the liquid collection container can include a sponge or other substance designed to absorb the liquid. The liquid collection container can be at least partially covered to help prevent evaporation. In some embodiments, the liquid collection container can include a cover that opens and closes. The cover can be controlled to open when liquid is to be received, and the cover can be closed upon receipt of the liquid to prevent contaminants from getting into the container and to prevent evaporation.

In some embodiments, the wavy surface may be movable such that the wavy surface can have a number of different orientations. For example, the wavy surface can be placed into a collection orientation in which liquid collects on the wavy surface, and then into a deposit orientation in which the collected liquid is deposited into a liquid collection container. In such an embodiment, the collection orientation can be flat (i.e., substantially parallel to a ground plane) and the deposit orientation can be angled (i.e., where the wavy surface is at an angle relative to the ground plane). Placing the wavy surface into the deposit orientation encourages the liquid to flow along (i.e., parallel to) the valleys of the wavy surface and into the liquid collection container. In such an embodiment, a cover for the liquid collection container can be opened prior to placing the wavy surface into the deposit orientation and closed once the liquid has been collected to prevent evaporation, contamination, etc.

The system can also include a housing that holds the wavy surface, the liquid collection container, the fan, a power source, and/or electronics. The housing can be sized based on the size of the wavy surface to be included therein. In some embodiments, the housing can include a plurality of wavy surfaces, each of which is designed to collect liquid. The various wavy surfaces in the housing can be the same or have different characteristics as described herein. The power source can include a battery, a solar panel and accompanying hardware, and/or a plug for a power receptacle. The electronics can include a computing system (described in detail below), an actuator to move the wavy surface(s) within the housing, an actuator to open/close a cover to the liquid collection container, controls for the fan, etc.

Figure 6:
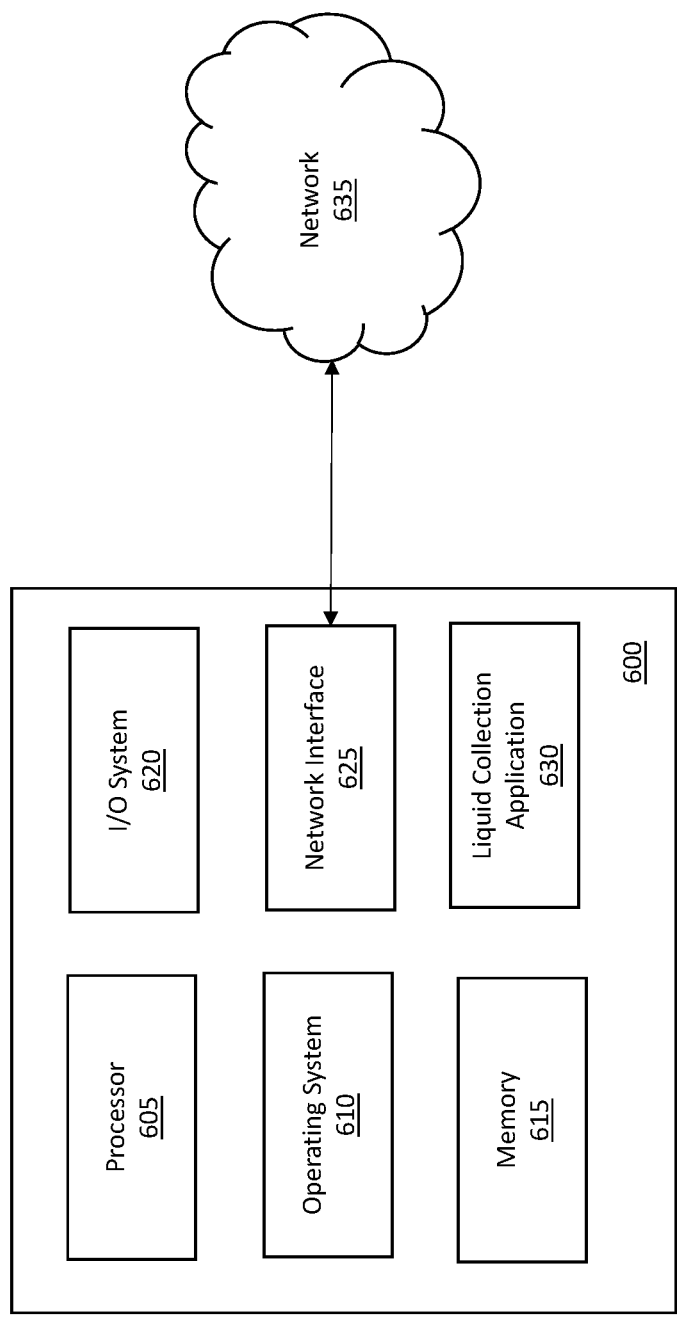
FIG. 6 is a block diagram of a computing device for a liquid collection system in accordance with an illustrative embodiment.

FIG. 6 is a block diagram of a computing device 600 in communication with a network 635 in accordance with an illustrative embodiment. The computing device 600 can be part of the electronics included in a liquid collection system in an illustrative embodiment. The computing device 600 can alternatively be a standalone system that is used to design a liquid collection system based on desired characteristics of the system. The computing device 600 includes a processor 605, an operating system 610, a memory 615, an input/output (I/O) system 620, a network interface 625, and a liquid collection application 630. In alternative embodiments, the computing device 600 may include fewer, additional, and/or different components. The components of the computing device 600 communicate with one another via one or more buses or any other interconnect system. In an illustrative embodiment, the computing device 600 is a dedicated device that is incorporated into the liquid collection system. Alternatively, the computing device 600 can be any type of networked computing device such as a laptop computer, desktop computer, smart phone, tablet, gaming device, workstation, server, a music player device, etc.

The processor 605 can be used to determine parameters for a liquid collection system, control the liquid collection system, provide data regarding the operation of the liquid collection system, etc. In one embodiment, the processor 605 can determine surface parameters for the wavy surface based on the application. The wavy surface patterns can differ based on the application of the surface being formed, the conditions in which the surface will be subjected, the material from which the substrate that forms the surface is made, the coating/treatment on the substrate, etc. The processor 605 can also control the system fan (if present), control movement and orientation of the wavy surface, control the liquid collection container, etc.

The processor 605 can be any type of computer processor known in the art, and can include a plurality of processors and/or a plurality of processing cores. The processor 605 can include a controller, a microcontroller, an audio processor, a graphics processing unit, a hardware accelerator, a digital signal processor, etc. Additionally, the processor 605 may be implemented as a complex instruction set computer processor, a reduced instruction set computer processor, an x86 instruction set computer processor, etc. The processor 605 is used to run the operating system 610, which can be any type of operating system.

The operating system 610 is stored in the memory 615, which is also used to store programs, user data, network and communications data, peripheral component data, the liquid collection application 630, and other operating instructions. The memory 615 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. The memory 615 can include computer-readable instructions that, upon execution by the processor 605, cause any of the operations described herein to be performed.

The I/O system 620 is the framework which enables users and peripheral devices to interact with the computing device 600. The I/O system 620 can include a mouse, a keyboard, one or more displays, a speaker, a microphone, etc. that allow the user to interact with and control the computing device 600. The I/O system 620 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 625 includes transceiver circuitry that allows the computing device 600 to transmit and receive data to/from other devices such as remote computing systems, servers, websites, etc. The network interface 625 enables communication through a network 635, which can be one or more communication networks. The network 635 can include a cable network, a fiber network, a cellular network, a wi-fi network, a landline telephone network, a microwave network, a satellite network, etc. The network interface 625 also includes circuitry to allow device-to-device communication such as Bluetooth® communication.

The liquid collection application 630 can include software in the form of computer-readable instructions which, upon execution by the processor 605, performs any of the various operations described herein for determining and analyzing surface characteristics, dimensions, shapes, coatings, etc. The liquid collection application 630 can also be used to control a liquid collection system, as described herein. Specifically, the liquid collection application 630 can utilize the processor 605 and/or the memory 615 as discussed above to control the system and its components. In an alternative implementation, the liquid collection application 630 can be remote or independent from the computing device 600, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to collect liquid, comprising:
   a wavy surface formed on a substrate, wherein the wavy surface includes a plurality of waves, and wherein the plurality of waves are configured to capture liquid from the air such that the liquid accumulates in valleys of the waves, wherein a first portion of the wavy surface includes no coating and no textures, wherein a second portion of the wavy surface includes a first set of textures and no coating, wherein a third portion of the wavy surface includes a hydrophobic coating and no textures, wherein a fourth portion of the wavy surface includes the hydrophobic coating and a second set of textures such that the first portion, the second portion, third portion, and the fourth portion of the wavy surface have distinct surface wettabilities; and
   a liquid collection container configured to collect the liquid captured on the plurality of waves.

2. The system of claim 1, further comprising an actuator configured to control an orientation of the wavy surface relative to the directed air.

3. The system of claim 2, further comprising a processor configured to control the actuator such that the wavy surface is in a collection orientation to capture the liquid or a deposit orientation to deposit the liquid into the liquid collection container.

4. The system of claim 1, further comprising an actuator configured to open and close a cover of the liquid collection container.

5. The system of claim 1, wherein the hydrophobic coating on the wavy surface controls a liquid contact angle of the wavy surface.

6. The system of claim 5, wherein the hydrophobic coating comprises a nano-coating.

7. The system of claim 1, further comprising a housing that is configured to contain at least the substrate and the liquid collection container.

8. The system of claim 1, wherein the substrate has a first side that includes the wavy surface and a second side opposite the wavy surface that is flat.

9. The system of claim 1, further comprising a fan that is configured to direct air over the substrate.

* * * * *